United States Patent [19]

Collett

[11] Patent Number: 4,889,025

[45] Date of Patent: Dec. 26, 1989

[54] HIGH IMPACT RESISTANT CARBIDE TIP FOR A CIRCULAR SAW

[76] Inventor: Kenneth L. Collett, 502 N. Main St., Berryville, Ark. 72616

[21] Appl. No.: 197,284

[22] Filed: May 23, 1988

[51] Int. Cl.$^4$ ............................................. B27B 33/08
[52] U.S. Cl. ....................................... 83/835; 83/846; 83/837; 144/241
[58] Field of Search ............... 30/347; 51/206 R, 309, 51/307; 72/467; 75/236, 240, 82, 236; 76/101 A; 83/835, 659, 623, 837, 853, 842, 855, 839, 846; 148/16.6; 427/436; 428/678; 144/223, 241

[56] References Cited

U.S. PATENT DOCUMENTS

| | | | |
|---|---|---|---|
| Re. 28,485 | 7/1975 | Rix et al. ............................ | 204/37.1 |
| 1,775,361 | 9/1930 | Bevis .................................... | 83/842 |
| 2,575,980 | 11/1951 | Simmons ............................. | 83/842 |
| 4,097,275 | 6/1978 | Horvath ............................... | 419/15 |

Primary Examiner—Frank T. Yost
Assistant Examiner—Y. Lin
Attorney, Agent, or Firm—William S. Dorman

[57] ABSTRACT

An improved cutting tooth for a circular saw of the type commonly used to cut the bark off raw logs comprising a crescent shaped steel bit and a wedge shaped cutting tip affixed to an upper portion of the bit wherein the cutting tip is composed of a high impact resistant carbide alloy consisting essentially of a blend of 83.5% tungsten carbide, 16% cobalt and 0.5% tantalum carbide.

4 Claims, 2 Drawing Sheets

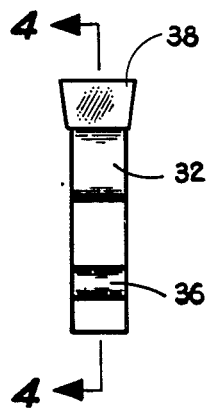
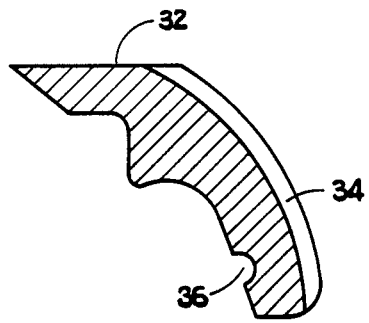
Fig. 3
(PRIOR ART)
Fig. 4
(PRIOR ART)
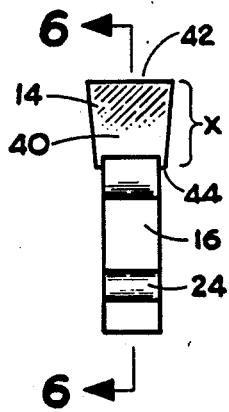
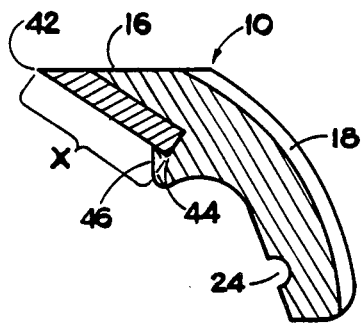
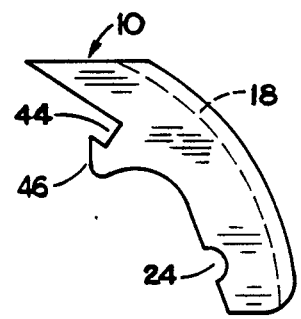
Fig. 5
Fig. 6
Fig. 7

HIGH IMPACT RESISTANT CARBIDE TIP FOR A CIRCULAR SAW

BACKGROUND OF THE INVENTION

1. Field of the Invention

The present invention relates to an improved cutting tooth which is commonly used in sawmills to process raw logs. More particularly, the present invention relates to a high impact resistant carbide tip for an inserted tooth circular saw wherein the tip is composed of tungsten carbide, cobalt and tantalum carbide.

2. The Prior Art

The sawmill industry is the initial step in the processing of dimensional lumber. The industry generally employs steel inserted tooth circular saws to cut the bark off the raw logs. Afterwards, the resaw industry employs carbide-tipped saws to further process the lumber.

The carbide currently used in the resaw industry has a low impact resistance to the hard materials, such as sand, grit and gravel, normally encountered in the bark of raw logs and thus has a tendency to shatter upon impact with these materials. The above low impact grade of carbide is an alloy consisting of 96% tungsten carbide and 4% cobalt, and has been used extensively by the resaw industry because of the longer sharpening life provided by the high percentage of tungsten carbide in the alloy. Heretofore, the sawmill industry has considered the use of carbide for their inserted tooth saws to be unfeasible.

Although, the currently used steel inserted teeth for the saws do not generally shatter during the primary sawing operation, it is necessary to sharpen the tips after cutting 2500 board feet of lumber. These conventional tips (teeth) also have to be completely replaced approximately once a week.

A preliminary search was conducted on the present invention and the following patents were found in the search:

Re. 32,380—Wentorf, Jr., et al.,
1,904,568—Taylor,
2,053,977—Taylor,
2,121,448—Ritzau,
2,791,248—Beale,
3,171,192—Ortner et al.,
3,343,308—Fessel,
3,451,791—Meadows,
3,496,973—Ballard,
3,730,038—Farb,
3,745,623—Wentorf, Jr. et al.,
3,766,808—Cremisio et al.,
3,850,053—Bovenkerk,
3,982,911—Lee,
4,046,517—Soga,
4,225,322—Knemeyer,
4,324,163—LaVelle,
4,352,840—Sievers,
4,394,170—Sawaoka et al.,
4,439,470—Sievers,
4,399,198—Lomax et al.,
4,466,829—Nishigaki et al.,
4,637,370—Ishizuka,
4,656,099—Sievers,
4,690,024—Chaconas.

U.S. Pat. No. 4,690,024 to Chaconas, U.S. Pat. No. 4,324,163 to LaVelle, and U.S. Pat. No. 3,730,038 to Farb, claim a circular saw blade tip made of tungsten carbide.

U.S. Pat. No. 3,766,808 to Cremisio et al. discloses a bimetal saw.

U.S. Pat. No. 4,656,099 to Sievers, U.S. Pat. No. 4,046,517 to Soga, U.S. Pat. No. 3,982,911 to Lee, and U.S. Pat. No. 3,171,192 to Ortner et al., disclose abrasive carbides. The list of materials used include tungsten carbide, tantalum carbide, and cobalt.

U.S. Pat. No. Re. 32,380 to Wentorf, Jr., et al., U.S. Pat. No. 4,225,322 to Knemeyer, U.S. Pat. No. 3,850,053 to Bovenkerk, and U.S. Pat. No. 3,745,623 to Wentorf, Jr., et al, disclose diamond tools containing tungsten carbide, tantalum carbide and cobalt.

U.S. Pat. No. 4,439,470 to Sievers, U.S. Pat. No. 4,399,198 to Lomax et al., and U.S. Pat. No. 4,394,170 to Sawaoka et al, disclose a composite of metals which includes tungsten carbide, cobalt and tantalum carbide.

U.S. Pat. No. 3,496,973 to Ballard, discloses a circular saw with a lamination of tungsten carbide grit and cobalt.

U.S. Pat. No. 3,343,308 to Fessel, discloses a circular saw. The teeth of the saw are made of tungsten carbide. Note FIG. 9.

U.S. Pat. No. 4,466,829 to Nishigaki et al., U.S. Pat. No. 4,352,840 to Sievers, U.S. Pat. No. 3,451,791 to Meadows, U.S. Pat. No. 2,121,448 to Ritzau, and U.S. Pat. No. 1,904,568 to Taylor, disclose tools which contain tungsten carbide, cobalt, or tantalum carbide.

In summary, no patents were found where the replaceable teeth (or the tips thereof) were made of tungsten carbide, cobalt, and tantalum carbide. In fact, no saw blade per se was uncovered including these three ingredients.

SUMMARY OF INVENTION

The present invention provides an improved cutting tooth for a type of circular saw commonly referred to as a primary or head saw. The head saw is employed in the initial cutting step wherein the bark is removed from the raw logs. The present invention comprises a cutting tooth or bit comprising a soft steel crescent-shaped holder onto which is affixed a high impact resistant carbide tip. The bit has been adapted to be inserted into a depression in a conventional inserted tooth circular saw.

A different grade of tungsten carbide, which is generally employed for high impact applications such as mining and drilling, has been applied to a head saw in accordance with the present invention. This grade of carbide is an alloy consisting of 83.5% tungsten carbide, 16% cobalt and 0.5% tantalum carbide. The cutting tip of an inserted steel tooth or bit has been replaced by a wedge of the above tungsten carbide alloy.

BRIEF DESCRIPTION OF THE DRAWINGS

FIG. 3 is a front elevational view of a steel cutting tooth or bit used in the prior art for head saws;

FIG. 4 is a cross-sectional view taken along section line 4—4 of FIG. 3.

FIG. 5 is a front elevational view of a bit and its affixed carbide tip in accordance with the present invention;

FIG. 6 is a cross-sectional view taken along section line 6—6 of FIG. 5; and

FIG. 7 is a side elevational view of a holder without the attached carbide tip.

DETAILED DESCRIPTION OF THE PREFERRED EMBODIMENTS

Figure 1:
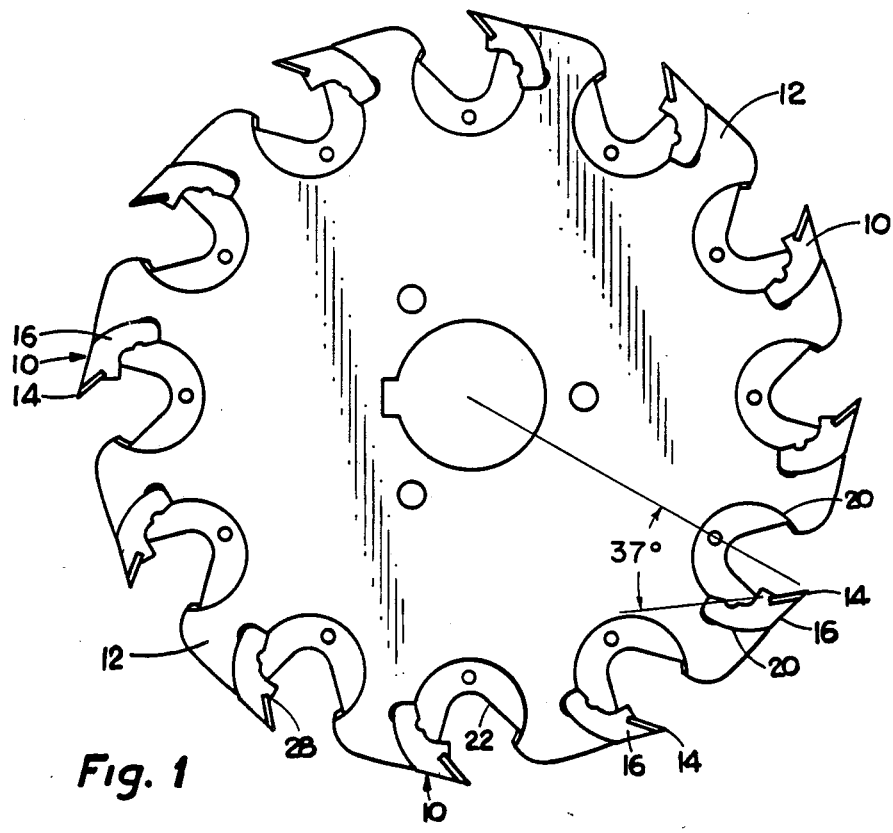
FIG. 1 is a side elevational view of a primary or head saw provided with a plurality of inserted cutting teeth or bits of the present invention.
Figure 2:
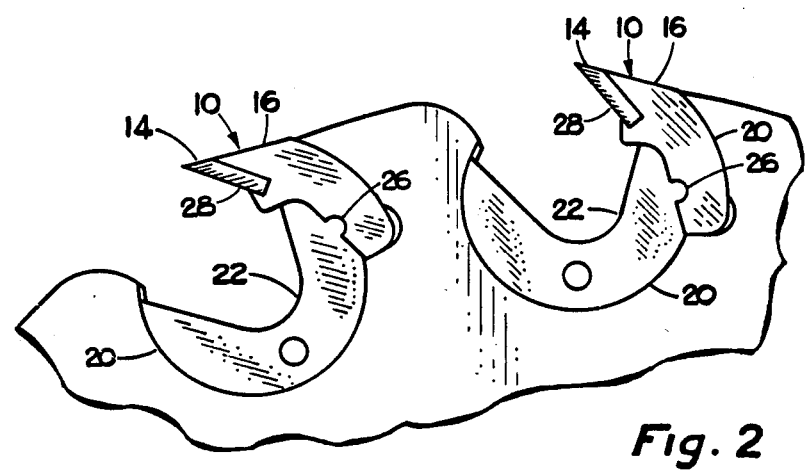
FIG. 2 is an enlarged view of a portion of FIG. 1 showing two of the inserted teeth and the high impact carbide tips affixed thereto.

Referring to the drawings in detail, FIGS. 1 and 2 show a plurality of inserted cutting teeth or bits 10 installed in a circular steel head saw 1. Bit 10 comprises a crescent-shaped steel holder 16 and a wedge-shaped carbide tip 14 which is soldered or brazed onto the upper portion of the holder.

As is common among the components of inserted tooth saws, bit 10 is provided with a central groove 18 (see FIGS. 6 and 7) along its outer side. Groove 18 slides onto a corresponding ridge (not shown) along a cut-out area or depression 20 of saw 12. Bit 10 is held in place by means of a semi-circular shank 22 which is also provided with a similar groove (not shown) along its outer side and which slides onto the remaining portion of the ridge on the cut-out behind the bit. As shown in FIGS. 6 and 7, the configuration of the inner side of bit 10 is such that it matches a portion of shank 22; that is, the bit is provided with a notch 24 which fits a corresponding rib 26 on the shank 22. Bit 10 is maintained within the saw 12 by means of the tension created by the shank.

The bit 10 and tip 14 are positioned so that a hook 28 is formed having a positive angle of 37° with respect to the radius of the saw. Although the aforementioned angle is considered to be preferable, the bit can be positioned so that it has a positive hook angle of as much as 40° or a negative hook angle as little as −5°.

FIGS. 3 and 4 show a representation of the current art in the sawmill industry. A standard steel tooth or bit 32 is shown to have a crescent shape similar to that of holder 16. Steel tooth 32 is also provided with its respective groove 34 and notch 36 so that it is inserted into a conventional inserted tooth head saw in the same manner as described above.

Although bit 10 and steel tooth 32 are similar in shape, the differences are shown in greater detail in FIGS. 5, 6 and 7. Referring to FIG. 5, the cutting face 40 of the tooth 14 is longer and narrower than the corresponding cutting face 38 of the prior art steel tooth 32. More specifically, if the height or length of face 40 represents some base value "x", then the width of the face along its top edge 42 is equal to 0.666 of "x" and the width of the face along its bottom edge 44 is equal to 0.53 of "x". The width of the holder as viewed from FIG. 5 is equal to 0.44 of "x".

The type of material used for tip 14 is a carbide alloy composed of 83.5% tungsten carbide (WC) and 16% cobalt (Co.) and 0.5% tantalum carbide (TaC).

The present application constitutes an improvement over the prior art in several particulars. First of all, a slot 44 is provided in the bit 10 by virtue of a projection 46 which forms the lower innerside of slot 44 (see FIGS. 6 and 7). The lower end of the carbide tip 14 is received in the slot 44. The tip 14 is soldered or brazed to the bit 10 and the slot 44 provides a secure anchor. The slot locks the carbide tip in place so that it can leverage itself from top to bottom. Secondly, the carbide alloy described above has been used for dies and punches but has never been used in saws or saw tips.

Whereas the present invention has been described in particular relation to the drawings attached hereto, other and further modifications, apart from those shown or suggested herein, may be made within the spirit and scope of this invention.

What is claimed is:

1. An improved cutting tooth for a circular saw of the type commonly used to cut raw logs comprising a crescent shaped steel bit and a wedge shaped cutting tip affixed to an upper portion of said bit wherein said cutting tip is composed of a high impact resistant carbide alloy consisting essentially of a mixture of 83.5% tungsten carbide, 16% cobalt and 0.5% tantalum carbide, said bit being disposed in said circular saw so that said cutting tip has a hook with a positive angle of about 37° with respect to the radius of said saw.

2. An improved cutting tooth as set forth in claim 1 and being further characterized by said wedge shaped cutting tip having a trapezoidal cutting face.

3. An improved cutting tooth as set forth in claim 2 wherein the length of said cutting face is equal to a base value such that the width of said cutting face along its top edge is equal to 0.666 of said base value and the width of said cutting face along its bottom edge is equal to 0.53 of said base value.

4. An improved cutting tooth as set forth in claim 1 wherein said cutting tip has an inner end which is received in a slot in said bit.

* * * * *

REEXAMINATION CERTIFICATE (3069th)

United States Patent [19]
Collett et al.

[11] B1 4,889,025
[45] Certificate Issued Dec. 3, 1996

[54] HIGH IMPACT RESISTANT CARBIDE TIP FOR A CIRCULAR SAW

[76] Inventors: Kenneth L. Collett, late of Berryville, Ark.; by John Collett, legal representative, 502 N. Main St., Berryville, Ark. 72616

Reexamination Request:
No. 90/004,096, Oct. 24, 1995

Reexamination Certificate for:
Patent No.: 4,889,025
Issued: Dec. 26, 1989
Appl. No.: 197,284
Filed: May 23, 1988

[51] Int. Cl.⁶ .................... B27B 33/08; B27B 33/12
[52] U.S. Cl. .................... 83/835; 83/837; 83/842; 83/846; 144/241
[58] Field of Search .................... 83/843, 842, 840, 83/839

[56] References Cited

U.S. PATENT DOCUMENTS

| | | |
|---|---|---|
| 15,038 | 7/1919 | Culley . |
| Re. 28,485 | 7/1975 | Rix et al. . |
| Re. 32,380 | 3/1987 | Wentorf, Jr. et al. . |
| 258,362 | 5/1882 | Brooke . |
| 317,656 | 5/1885 | Lippert .................... 83/843 |
| 409,271 | 8/1889 | Cardiff . |
| 1,337,016 | 4/1920 | Jenkins . |
| 1,356,682 | 10/1920 | Woodcook . |
| 1,775,361 | 9/1930 | Bevis . |
| 1,831,705 | 11/1931 | Freas . |
| 1,904,568 | 4/1933 | Taylor . |
| 2,053,977 | 9/1936 | Taylor . |
| 2,117,147 | 5/1938 | Charlton . |
| 2,121,448 | 6/1938 | Ritzau . |
| 2,122,196 | 6/1938 | Miner et al. . |
| 2,575,980 | 11/1951 | Simmons . |
| 2,609,017 | 9/1952 | Chapin . |
| 2,703,118 | 3/1955 | Roberts . |
| 2,734,534 | 2/1956 | Standal . |
| 2,791,248 | 5/1957 | Beale . |
| 3,091,267 | 5/1963 | Fiezell . |
| 3,171,192 | 3/1965 | Ortner et al. . |
| 3,236,271 | 2/1966 | Fruits . |
| 3,343,308 | 9/1967 | Fessel . |
| 3,372,719 | 3/1968 | Shone . |
| 3,451,791 | 6/1969 | Meadows . |
| 3,463,206 | 8/1969 | Briggs et al. . |
| 3,496,973 | 2/1970 | Ballard . |
| 3,528,465 | 9/1970 | Omley . |
| 3,730,038 | 5/1973 | Farb . |
| 3,745,623 | 7/1973 | Wentorf, Jr. et al. . |
| 3,766,808 | 10/1973 | Cremisio et al. . |
| 3,850,053 | 11/1974 | Bovenkerk . |
| 3,935,034 | 1/1976 | Hayes . |
| 3,982,911 | 9/1976 | Lee . |
| 4,046,517 | 9/1977 | Soga . |
| 4,084,470 | 4/1978 | Reed . |
| 4,097,275 | 6/1978 | Horvath . |
| 4,221,511 | 9/1980 | Stefan et al. . |
| 4,225,322 | 9/1980 | Knemeyer . |
| 4,324,163 | 4/1982 | LaVelle . |
| 4,352,840 | 10/1982 | Sievers . |
| 4,394,170 | 7/1983 | Sawaoka et al. . |
| 4,399,198 | 8/1983 | Lomax et al. . |
| 4,439,470 | 3/1984 | Sievers . |
| 4,466,829 | 8/1984 | Nishigaki et al. . |
| 4,637,370 | 1/1987 | Ishizuka . |
| 4,656,099 | 4/1987 | Sievers . |
| 4,690,024 | 9/1987 | Chaconas . |
| 4,705,124 | 11/1987 | Abrahamson et al. . |
| 4,765,217 | 8/1988 | Ludwig . |
| 4,848,205 | 7/1989 | Suzuki et al. . |
| 4,885,968 | 12/1989 | Tuomaala . |
| 4,955,273 | 9/1990 | Pawlosky . |
| 5,092,212 | 3/1992 | Pawlosky . |

FOREIGN PATENT DOCUMENTS 0590582  1/1960  Canada .................... 83/843

*Primary Examiner*—Kenneth E. Peterson

[57] ABSTRACT

An improved cutting tooth for a circular saw of the type commonly used to cut the bark off raw logs comprising a crescent shaped steel bit and a wedge shaped cutting tip affixed to an upper portion of the bit wherein the cutting tip is composed of a high impact resistant carbide alloy consisting essentially of a blend of 83.5% tungsten carbide, 16% cobalt and 0.5% tantalum carbide.

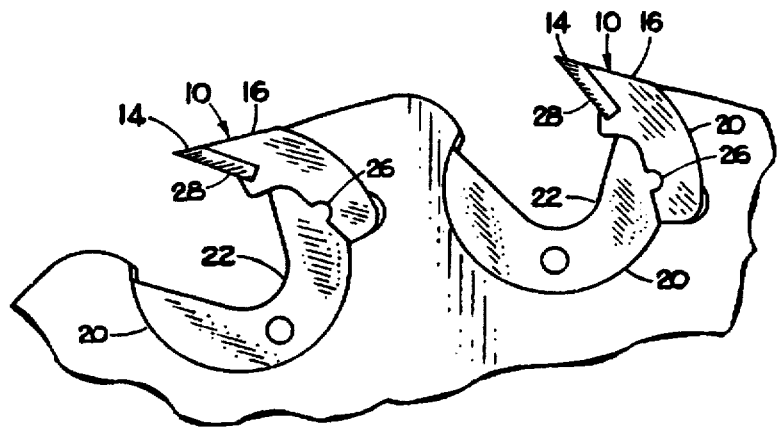

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–4 are cancelled.

Claim 1 is determined to be patentable as amended.

New claims 5–8 are added and determined to be patentable.

1. An improved cutting tooth for a circular saw of the type commonly used to cut raw logs comprising a crescent shaped steel bit and a wedge shaped cutting tip affixed to an upper portion of said bit wherein said cutting tip is composed of high impact resistant carbide alloy consisting essentially of a mixture of 83.5% tungsten carbide, 16% cobalt and 0.5% tantalum carbide, said bit being disposed in said circular saw so that said cutting tip has a hook with a positive angle of about 37° with respect to the radius of said saw, *said cutting tip has an inner end which is received in a slot in said bit,*

*said crescent shaped steel bit has an outer edge and an inner edge, said outer edge comprises a curved portion and a flattened portion,*

*said inner edge of said bit comprises a projection extending in a direction away from said outer edge, said projection having a forward edge on one side with said slot formed therein and a concave edge formed on a side of said projection opposite said forward edge for receiving a portion of a shank for holding said bit to said circular saw,*

*said slot comprising first and second spaced apart edges which face each other and a transverse edge extending between said first and second edges with said first edge facing in the direction of said outer edge of said bit and said second edge comprising an elongate slot edge which joins said flattened portion of said bit such that said elongate slot edge and said flattened portion of said bit define an acute angle,*

*said first edge of said slot being much shorter than said second edge,*

*said cutting tip having its said inner end located and secured in said slot with an elongated tip portion located adjacent to said second edge and a cutting tip outer edge which joins said elongated tip portion defining an obtuse angle therebetween,*

*said cutting tip having a cutting face opposite said elongate tip portion with a substantial portion of said cutting face being located outside of said slot such that an inner edge of said tooth is defined by a portion of said cutting face of said tip, said forward edge and said concave edge.*

*5. The cutting tooth of claim 1, wherein;*

*in a plane transverse to said cutting face, said projection extends beyond said first edge a distance at least as great as the distance between said first and second edges.*

*6. The cutting tooth of claim 1, wherein;*

*said cutting face of said tip joins said outer edge of said tip at a pointed edge defining an acute angle between said cutting face and said outer edge of said tip,*

*said pointed edge has a width greater than the width of said inner end of said tip located and secured in said slot.*

*7. The cutting tooth of claim 6, wherein;*

*in a plane transverse to said cutting face, said projection extends beyond said first edge a distance at least as great as the distance between said first and second edges.*

*8. The cutting tooth of claim 7, wherein;*

*said forward edge of said projection extends beyond said first edge and is generally transverse to said flattened portion of said bit.*

* * * * *